United States Patent
Miyazawa et al.

(10) Patent No.: US 8,278,233 B2
(45) Date of Patent: Oct. 2, 2012

(54) TRANSLUCENT POLYCRYSTALLINE SINTERED BODY, METHOD FOR PRODUCING THE SAME, AND ARC TUBE FOR HIGH-INTENSITY DISCHARGE LAMP

(75) Inventors: Sugio Miyazawa, Kasugai (JP); Keiichiro Watanabe, Kasugai (JP); Tsuneaki Ohashi, Nagoya (JP); Hisanori Yamamoto, Komaki (JP)

(73) Assignee: NGK Insulators, Ltd., Nagoya (JP)

( * ) Notice: Subject to any disclaimer, the term of this patent is extended or adjusted under 35 U.S.C. 154(b) by 63 days.

(21) Appl. No.: 12/877,299

(22) Filed: Sep. 8, 2010

(65) Prior Publication Data
US 2011/0059839 A1 Mar. 10, 2011

(30) Foreign Application Priority Data

Sep. 9, 2009 (JP) ................. 2009-207941
Oct. 9, 2009 (JP) ................. 2009-234874

(51) Int. Cl.
*C04B 35/115* (2006.01)

(52) U.S. Cl. ........ 501/153; 501/127; 313/636; 264/653; 264/658

(58) Field of Classification Search ............. 501/127, 501/153; 313/636; 264/653, 681
See application file for complete search history.

(56) References Cited

U.S. PATENT DOCUMENTS

| | | | | |
|---|---|---|---|---|
| 4,214,666 A | * | 7/1980 | Oda et al. ............... | 220/2.1 R |
| 4,285,732 A | * | 8/1981 | Charles et al. ............. | 501/101 |
| 4,373,030 A | * | 2/1983 | Kaneno et al. ............. | 501/152 |
| 4,495,116 A | * | 1/1985 | Kaneno et al. ............. | 264/1.22 |
| 4,797,238 A | * | 1/1989 | Rhodes et al. ............. | 264/1.21 |
| 4,948,538 A | * | 8/1990 | Wei et al. ............... | 264/6 |
| 5,625,256 A | * | 4/1997 | Tiedt et al. ............. | 313/636 |
| 5,682,082 A | * | 10/1997 | Wei et al. ............... | 313/636 |
| 5,683,949 A | * | 11/1997 | Scott et al. ............. | 501/86 |
| 6,306,788 B1 | * | 10/2001 | Watanabe et al. .......... | 501/153 |
| 6,482,761 B1 | * | 11/2002 | Watanabe et al. .......... | 501/153 |
| 2008/0283522 A1 | * | 11/2008 | Qin et al. ............... | 220/2.1 R |
| 2008/0284338 A1 | * | 11/2008 | Sivaraman et al. ......... | 313/636 |

FOREIGN PATENT DOCUMENTS

JP 2780941 B2 5/1998

* cited by examiner

*Primary Examiner* — Karl Group
(74) *Attorney, Agent, or Firm* — Burr & Brown

(57) ABSTRACT

A translucent polycrystalline sintered body is mainly composed of an alumina, is suitable for the manufacture of an arc tube for a high-intensity discharge lamp, and has an average grain diameter of 35 to 70 μm, preferably 50 to 60 μm. In a case where the sintered body is in a 0.5-mm-thick flat plate shape, the in-line transmittance of the sintered body is 30% or more, preferably 50% or more. In this case, the ratio between maximum and minimum in-line transmittance values is 2:1 to 1:1 in the visible region of 360 to 830 nm. The bending strength of the sintered body is 250 MPa or more, preferably 300 MPa or more.

20 Claims, 7 Drawing Sheets

TRANSLUCENT POLYCRYSTALLINE SINTERED BODY, METHOD FOR PRODUCING THE SAME, AND ARC TUBE FOR HIGH-INTENSITY DISCHARGE LAMP

CROSS-REFERENCE TO RELATED APPLICATION

This application is based upon and claims the benefit of priority from Japanese Patent Applications No. 2009-207941 filed on Sep. 9, 2009 and No. 2009-234874 filed on Oct. 9, 2009, of which the contents are incorporated herein by reference.

BACKGROUND OF THE INVENTION

1. Field of the Invention

The present invention relates to a translucent polycrystalline sintered body suitable for the manufacture of an arc tube for a high-intensity discharge lamp (HID: High Intensity Discharged lamp) such as a high-pressure sodium vapor lamp or a metal halide lamp. The invention further relates to a method for producing the translucent polycrystalline sintered body and an arc tube for high-intensity discharge lamp containing the translucent polycrystalline sintered body.

2. Description of the Related Art

A method described in Japanese Patent No. 2780941 is known as a technology for improving the load capacity of a sintered ceramic body for a high-intensity discharge lamp, thereby improving the load capacity of the discharge lamp. The load includes the thermal wall load applied to the sintered body in operation of the discharge lamp and the wall temperature of the sintered body used as the discharge tube.

The method described in Japanese Patent No. 2780941 has been accomplished based on the finding that when three additives MgO (magnesium oxide), $ZrO_2$ (zirconium oxide), and $Y_2O_3$ (yttrium oxide) are used in combination, the resultant sintered ceramic body can exhibit significantly more excellent properties due to the interaction between the three components as compared with conventional ceramic bodies to which the additives are added not in the combination of the above three.

In conventional methods, the combination of MgO and $ZrO_2$ or the combination of MgO, $Y_2O_3$, and $La_2O_3$ (lanthanum oxide) is added, and the additives are used in relatively large amounts. However, the combination use of MgO, $Y_2O_3$, and $La_2O_3$ cannot produce satisfactory results, and rather the conventional ceramic bodies using the combination are inferior in qualities to ceramic bodies using only MgO.

In Japanese Patent No. 2780941, the problem of the conventional methods is solved by simultaneously adding the three additives (MgO, $ZrO_2$, and $Y_2O_3$) in small amounts. The amount (weight ratio) of MgO is 100 to 800 ppm, preferably 100 to 600 ppm, particularly preferably 150 to 280 ppm, the amount of $ZrO_2$ is 200 to 1200 ppm, preferably 200 to 800 ppm, particularly preferably 300 to 600 ppm, and the amount of $Y_2O_3$ is 10 to 300 ppm, preferably 10 to 150 ppm, particularly preferably 20 to 75 ppm.

Meanwhile, a translucent polycrystalline sintered body is suitable for the manufacture of an arc tube for a high-intensity discharge lamp such as a high-pressure sodium vapor lamp or a metal halide lamp. It is desired that the translucent polycrystalline sintered body is high in total light transmittance and mechanical strength (particularly bending strength). A translucent alumina (a sintered alumina body with translucency) has such characteristics, and thereby has been widely used for an arc tube.

However, in a high-intensity discharge lamp, the arc tube of the conventional translucent alumina is generally poor in in-line transmittance due to grain boundary birefringence, etc. A 0.5-mm-thick flat plate composed of the conventional translucent alumina has an in-line transmittance of less than 30%. A light generated by discharge between electrodes is scattered in the arc tube, and then emitted to the outside. Thus, the size of the light source is limited by the arc tube, and the arc tube acts not as a point light source but as a diffused light source. In a case where the discharge lamp is used in combination with a reflecting mirror in a store lighting, a projector light source, a car headlight, etc., the arc portion is placed and operated in a focal position or the like to obtain the optimum light distribution characteristics. When a light is emitted from a position other than the focal position, the desired light distribution characteristics cannot be obtained, resulting in optical design difficulty. It is difficult to control the light from the diffused light source by using the reflecting mirror or lens. Therefore, it is difficult to use the above discharge lamp in combination with the reflecting mirror in an optical device, and the use of the discharge lamp is limited to general lighting application.

In contrast, in a case where a translucent alumina having a high in-line transmittance in at least the visible region is used for an arc tube, a light generated by discharge between electrodes is directly emitted straight. When the arc tube has a small discharge distance, it can be utilized substantially as a point light source. The light from the point light source can be optically controlled by using a reflecting mirror or lens in combination therewith. For example, the light may be converted to a parallel light and may be collected in a spot.

The in-line transmittance may be improved by increasing the firing temperature, thereby increasing the average grain diameter of the sintered body. However, in this case, only some of the grains are grown, and a mixed grain structure containing fine grains and coarse grains is formed, which causes the in-line transmittance to be lowered. In addition, when the average grain diameter of the sintered body is excessively increased, bending strength deterioration and intergranular cracking (grain separation observed in growth process) may be caused disadvantageously.

The in-line transmittance may be improved also by extremely reducing the grain size to prevent the light scattering on the grain boundary (see, Japanese Laid-Open Patent Publication No. 2006-160595). However, in this case, the differences between the in-line transmittance values at various wavelengths are increased, thereby resulting in irregular color in the transmitted light. In addition, the material is fired at a lower firing temperature in this case, so that the resultant sintered body contains highly active grains and shows a low heat resistance unsuitable for the high-intensity discharge lamp for high-temperature use.

SUMMARY OF THE INVENTION

In view of the above problems, an object of the present invention is to provide a translucent polycrystalline sintered body having a high in-line light transmittance and a high bending strength, which is suitable for the manufacture of an arc tube for a high-intensity discharge lamp such as a high-pressure sodium vapor lamp or a metal halide lamp, and a method for producing the sintered body.

Another object of the present invention is to provide an arc tube having a high translucency and a high mechanical strength, which can be suitably used in a high-intensity discharge lamp.

A translucent polycrystalline sintered body is provided according to a first aspect of the present invention, which comprises an alumina as a main component and is suitable for the manufacture of an arc tube for a high-intensity discharge lamp, wherein the average grain diameter of the sintered grains forming the translucent polycrystalline sintered body is 35 to 70 μm, preferably 50 to 60 μm.

In the sintered body according to the first aspect, wherein the in-line transmittance of a 0.5-mm-thick flat plate of the translucent polycrystalline sintered body is 30% or more, preferably 50% or more, at a light wavelength of 600 nm.

In the sintered body according to the first aspect, wherein the ratio between maximum and minimum in-line transmittance values of a 0.5-mm-thick flat plate of the translucent polycrystalline sintered body is 2:1 to 1:1 in the visible region of 360 to 830 nm.

In the sintered body according to the first aspect, the bending strength of the translucent polycrystalline sintered body is 250 MPa or more, preferably 300 MPa or more.

In the sintered body according to the first aspect, wherein the total light transmittance of the translucent polycrystalline sintered body is 85% or more, preferably 90% or more, more preferably 95% or more.

The sintered body according to the first aspect further comprises MgO as an additive, wherein the MgO content is 30 to 200 ppm, preferably 30 to 100 ppm, more preferably 30 to 80 ppm, by weight.

The sintered body according to the first aspect further comprises $ZrO_2$ as an additive, wherein the $ZrO_2$ content is 200 to 1200 ppm, preferably 200 to 800 ppm, by weight.

The sintered body according to the first aspect further comprising comprises $Y_2O_3$ as an additive, wherein the $Y_2O_3$ content is 5 to 300 ppm, preferably 5 to 30 ppm, more preferably 5 to 9 ppm, by weight.

The sintered body according to the first aspect further comprises MgO, $ZrO_2$, and $Y_2O_3$ as additives, wherein the weight ratio of the total of the $ZrO_2$ and $Y_2O_3$ to the MgO is 1:1 to 50:1, preferably 2:1 to 15:1.

The sintered body according to the first aspect further comprises MgO and $Y_2O_3$ as additives, wherein the weight ratio of the $Y_2O_3$ to the MgO is 1:1 to 1:40, preferably 1:2 to 1:20, more preferably 1:5 to 1:10.

The sintered body according to the first aspect further comprises 10 to 50 ppm of $SiO_2$, 10 to 50 ppm of $Na_2O$, and 10 to 50 ppm of $K_2O$, by weight, as additives.

In the sintered body according to the first aspect, the sintered grains forming the translucent polycrystalline sintered body contain small grains having a grain diameter equal to or smaller than ½ of the average grain diameter, and wherein the number ratio of the small grains to all the grains in the sintered body is 40% or less, preferably 30% or less.

In the sintered body according to the first aspect, the sintered grains forming the translucent polycrystalline sintered body contains large grains having a grain diameter equal to or larger than 3/2 of the average grain diameter, and wherein the number ratio of the large grains to all the grains in the sintered body is 5% or more and 15% or less, preferably 10% or more and 15% or less.

According to a second aspect of the present invention, a method for producing a translucent polycrystalline sintered body according to the first aspect is provided, which comprises a material blending step of mixing a main component and an additive to prepare a mixture, a compact preparation step of forming the mixture to prepare a compact, a preliminary firing step of subjecting the compact to a preliminary firing treatment to prepare a sintered body precursor, and a principal firing step of subjecting the sintered body precursor to a principal firing treatment to produce the sintered body.

In the method according to the second aspect, the mixture is a slurry containing at least a solvent, a gelling agent, and a ceramic powder containing the main component and the additive, and the slurry is cast into a mold and then hardened to prepare the compact.

In the method according to the second aspect, an organic binder in the compact is decomposed and removed in an oxidative atmosphere in the preliminary firing step, and the sintered body precursor is fired at a temperature of 1700° C. to 2000° C. in a hydrogen atmosphere or vacuum in the principal firing step.

In the method according to the second aspect, the principal firing treatment is carried out multiple times in the principal firing step.

In the method according to the second aspect, wherein a period of time at which the sintered body precursor is fired at a temperature of 1700° C. to 2000° C. in the principal firing step is 3 hours or more, preferably 6 hours or more, more preferably 10 hours or more.

In the method according to the second aspect, MgO in the sintered body precursor is partially removed in the principal firing step.

In the method according to the second aspect, MgO in the sintered body precursor is partially removed in the principal firing step, and the MgO content of the resultant sintered body is reduced to ⅔, preferably to ½, more preferably to ⅓, of the initial MgO content used in the material blending step.

In the method according to the second aspect, an annealing treatment is carried out in air at a temperature of 1100° C. to 1600° C. after the principal firing treatment.

An arc tube for a high-intensity discharge lamp is provided according to a third aspect of the present invention, comprising a translucent polycrystalline sintered body according to the first aspect of the present invention.

An arc tube for a high-intensity discharge lamp is provided according to a fourth aspect of the present invention, comprising a translucent polycrystalline sintered body produced by a method according to the second aspect of the present invention.

As described above, the translucent polycrystalline sintered body of the present invention, obtainable by the method of the present invention, has a high in-line light transmittance and a high bending strength, and thereby is suitable for the manufacture of an arc tube for a high-intensity discharge lamp using a reflecting mirror (such as a high-pressure sodium vapor lamp or a metal halide lamp).

Furthermore, the arc tube of the present invention has a high translucency and a high mechanical strength, and thereby can be suitably used in combination with a reflecting mirror in a high-intensity discharge lamp.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

An embodiment of the translucent polycrystalline sintered body, the production method, and the arc tube for a high-intensity discharge lamp of the present invention will be described with reference to FIGS. 1 to 7 below. It should be noted that, in this description, a numeric range of "A to B" includes both the numeric values A and B as the lower limit and upper limit values.

A high-intensity discharge lamp using an arc tube according to this embodiment can be suitably used as a high-pressure sodium vapor discharge lamp or a metal halide lamp at an output rating of about 20 to 1000 W.

Figure 1:
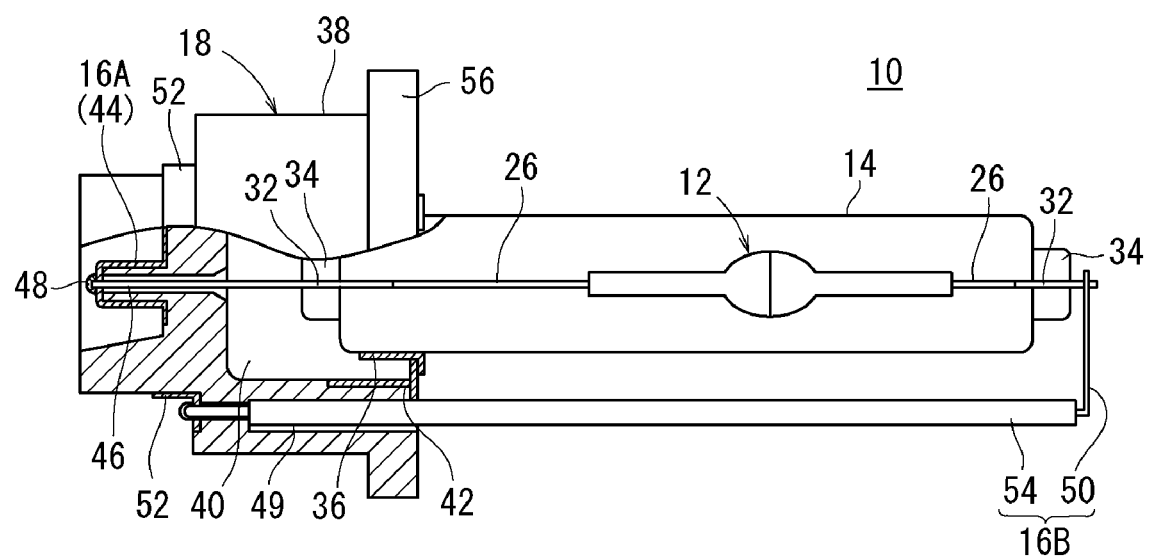
FIG. 1 is a partially sectioned front view showing an example of a car headlight using a high-intensity discharge lamp containing an arc tube (an arc tube for a high-intensity discharge lamp) according to an embodiment of the present invention.

As shown in FIG. 1, a high-intensity discharge lamp 10 according to this embodiment has a basic structure containing an arc tube 12, an outer tube 14 for enclosing the arc tube 12 inside, a pair of feed members (a first feed member 16A and a second feed member 16B) for feeding a power and supporting the outer tube 14, and a cap 18 connected to these components.

In the arc tube 12, a buffer gas and a starting gas including a noble gas such as argon (Ar) or xenon (Xe) are contained as discharge media, and a metal halide such as sodium iodide (NaI), thallium iodide (TlI), indium iodide (InI), or thulium iodide ($TmI_3$) is contained as a light-emitting metal.

Figure 2:
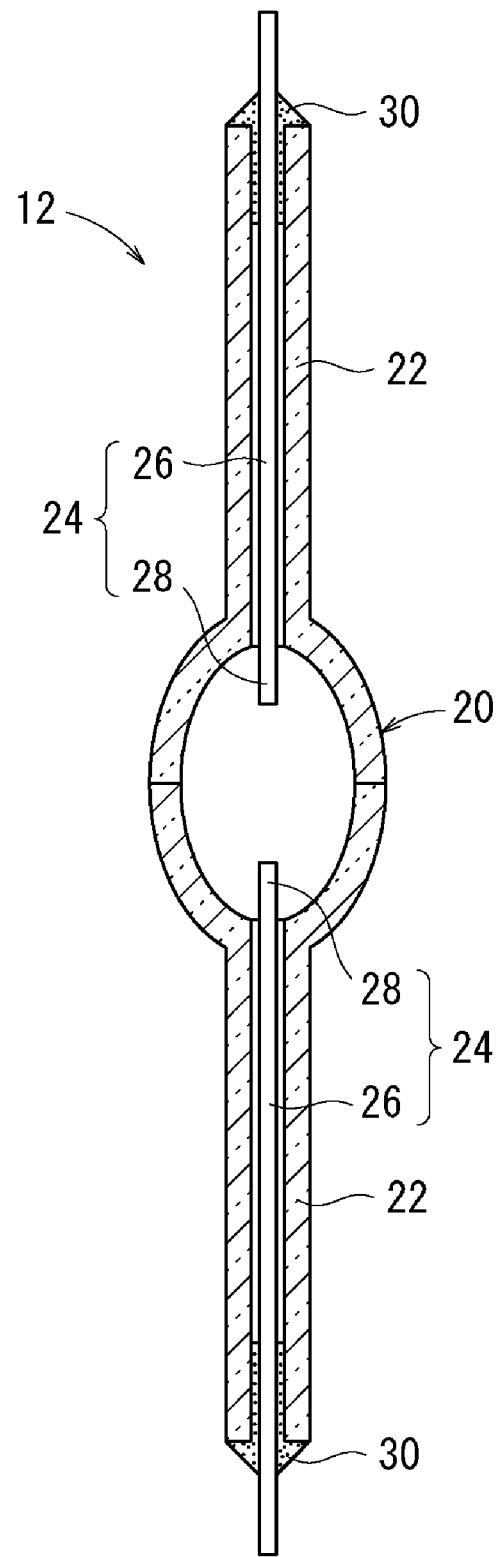
FIG. 2 is an enlarged, longitudinal sectional, front view showing an example of the arc tube of the embodiment.

As shown in FIG. 2, the arc tube 12 has a light-emitting portion 20 disposed in the intermediate position in the length direction, two small-diameter cylindrical portions 22, 22 extending from both sides of the light-emitting portion 20, and electrode structures 24, 24 inserted in the cylindrical portions 22, 22. Each of the electrode structures 24, 24 has a linear lead conductor 26 containing one or more metal wire materials such as tungsten (W), molybdenum (Mo), and niobium (Nb), and further has a discharge electrode 28 inserted into the light-emitting portion 20. A light source is formed between the ends of the two discharge electrodes 28, 28 facing each other in the light-emitting portion 20. The arc tube 12 has a symmetric structure, and the outer opening of each of the small-diameter cylindrical portions 22, 22 is airtightly sealed by a glass sealant 30.

When the inner surface of the cylindrical portion 22 and the outer surface of the lead conductor 26 are separated by a gap, it is preferred that a thin wire of tungsten (W), molybdenum (Mo), or the like is wound on the lead conductor 26 to reduce the gap. A protrusion of the lead conductor 26 extending from the opening of the cylindrical portion 22 may be connected to an external lead conductor wire. A tungsten (W) wire may be wound on the end of the discharge electrode 28 to form a coil electrode.

The outer tube 14 containing the arc tube 12 inside is a cylindrical vessel composed of a transparent material such as a fused quartz or an aluminosilicate glass. Airtight sealing portions 34, 34 are formed by externally heating and shrinking the ends of the outer tube 14. The lead conductor 26 extending from the arc tube 12 may be directly sealed by the sealing portion 34, or alternatively a metal member 32 having an affinity with a glass (such as a wire or foil of molybdenum Mo) may be placed on the lead conductor 26. The inside of the outer tube 14 is under a vacuum atmosphere or a noble gas atmosphere such as a nitrogen ($N_2$) or argon (Ar) atmosphere.

A metal band 36 is fixed by winding or the like in the vicinity of the sealing portion 34 in one end of the outer tube 14, and a ring metal strip 42 is disposed in a depression 40 in a cap shell 38. The metal band 36 is fixed to the ring metal strip 42 by spot welding, etc.

The first feed member 16A contains a metal wire 44. The metal wire 44 extends from an end of the outer tube 14 and passes through the depression 40 in the cap shell 38 and a channel 46 in an insulator. The end of the metal wire 44 is connected to a terminal 48 formed on the top of the cap 18 by welding, caulking, or brazing.

The second feed member 16B contains a metal wire 50 on the side opposite to the cap 18. A channel 49 is disposed approximately parallel to the outer tube 14 in the cap shell 38 at a position other than the depression 40. The metal wire 50 is passed through the channel 49 and connected to another terminal 52 formed in a ring shape on the outer surface of the cap shell 38 by welding, caulking, or brazing. As shown in FIG. 1, the exposed portion of the metal wire 50 extending along the outer tube 14 is covered with and electrically protected by an insulation pipe 54 composed of a ceramic or the like, and a flange 56 is externally formed on the end of the cap shell 38.

For example, the locking portion of the metal band 36 holding the outer tube 14 is placed on the ring metal strip 42 with reference to the flange 56 of the cap 18, and the position of the light-emitting portion 20 is adjusted. In the position adjustment, the arc tube 12 is temporarily driven and is moved to control the balance between the position of the light-emitting portion 20 and the focal position. Then, the locking portion of the metal band 36 is fixed to and integrated with the ring metal strip 42 by spot welding or the like, whereby the arc tube 12 is fixed to the cap 18 to obtain the high-intensity discharge lamp 10.

The arc tube 12 contains a translucent polycrystalline sintered body according to this embodiment (hereinafter simply referred to as the sintered body).

The sintered body of the embodiment contains an alumina as a main component, and the average grain diameter of the sintered body is 35 to 70 μm, preferably 50 to 60 μm. The sintered body may contain small grains having a grain diameter equal to or smaller than ½ of the average grain diameter, and may contain large grains having a grain diameter equal to or larger than 3/2 of the average grain diameter. In the grain size distribution, it is preferred that the number ratio of the above small grains to all the grains in the sintered body is 40% or less, and the number ratio of the above large grains to all the grains in the sintered body is 5% or more and 15% or less. It is further preferred that the number ratio of the small grains is 30% or less, and the number ratio of the large grains is 10% or more and 15% or less. The number of microscopic pores having a size of 5 μm or less in the sintered body is 390 or less, preferably 210 or less, more preferably 170 or less, per 1 $mm^2$. When the number ratio of the large grains having the grain diameter equal to or larger than 3/2 of the average grain diameter exceeds 15%, the transmittance does not increase, and further minute cracks tend to be generated, lowering the strength of the sintered body.

The sintered body may contain MgO, $ZrO_2$, and $Y_2O_3$ as additives.

In this case, the MgO content of the sintered body is 30 to 200 ppm, preferably 30 to 100 ppm, more preferably 30 to 80 ppm, by weight. The $ZrO_2$ content is 200 to 1200 ppm, preferably 200 to 800 ppm, by weight. The $Y_2O_3$ content is 5 to 300 ppm, preferably 5 to 30 ppm, more preferably 5 to 10 ppm, by weight.

The weight ratio of the total of the $ZrO_2$ and $Y_2O_3$ to the MgO is 1:1 to 50:1, preferably 2:1 to 15:1. The weight ratio of the $Y_2O_3$ to the MgO is 1:1 to 1:40, preferably 1:2 to 1:20, more preferably 1:5 to 1:10.

The sintered body may contain $SiO_2$, $Na_2O$, and $K_2O$ as additives. In this case, the sintered body preferably contains 10 to 50 ppm of $SiO_2$, 10 to 50 ppm of $Na_2O$, and 10 to 50 ppm of $K_2O$, by weight.

When the sintered body having the above structure according to the embodiment is in a 0.5-mm-thick flat plate shape, the in-line transmittance of the 0.5-mm-thick flat plate is 30% or more at a light wavelength of 600 nm, further preferably 50% or more. Particularly, the ratio between maximum and minimum in-line transmittance values of the 0.5-mm-thick flat plate is 2:1 to 1:1 in the visible region of 360 to 830 nm. Furthermore, the total light transmittance of the sintered body is 85% or more, preferably 90% or more, more preferably 95% or more, and the bending strength of the sintered body is 250 MPa or more, preferably 300 MPa or more.

The in-line transmittance of the sintered body of the embodiment can be improved by a conventional method, e.g. by reducing the thickness or by polishing the surface to improve the surface roughness. The conventional method may be selected depending on durability, cost, etc.

Methods for calculating the average grain diameter, and measuring the grain size distribution, the in-line transmittance, and the bending strength will be described below with reference to FIGS. 3 to 5.

[Average Grain Diameter Calculation Method]

The average grain diameter is calculated according to the following procedure.

(1) In each of three areas of the sintered body, a micrograph of a surface is taken (100 to 200 magnifications), and the grains on a straight line with a unit length are counted. The unit length is within the range of 500 to 1000 μm.

(2) The average of the counted grain numbers of the three areas is calculated.

(3) The average grain diameter is calculated using the following equation.

$$D=(4/\pi)\times(L/n) \quad \text{[Calculation equation]}$$

[D: Average grain diameter, L: Unit length of straight line, n: Average of counted grain numbers of three areas]

Figure 3:
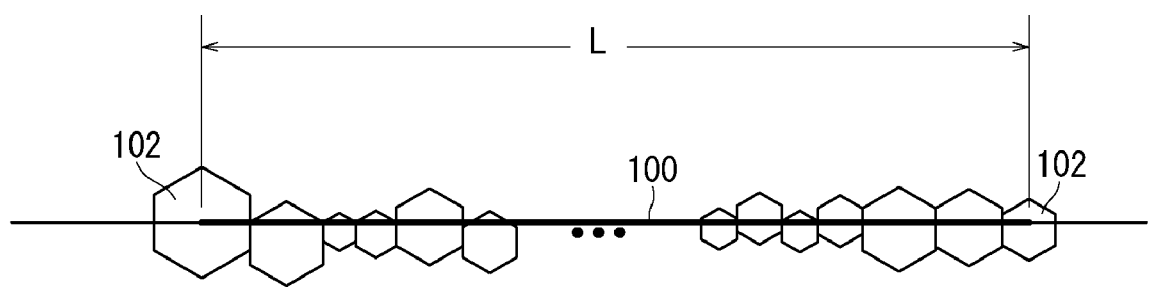
FIG. 3 is an explanatory view showing a method for calculating an average grain diameter.
Figure 4:
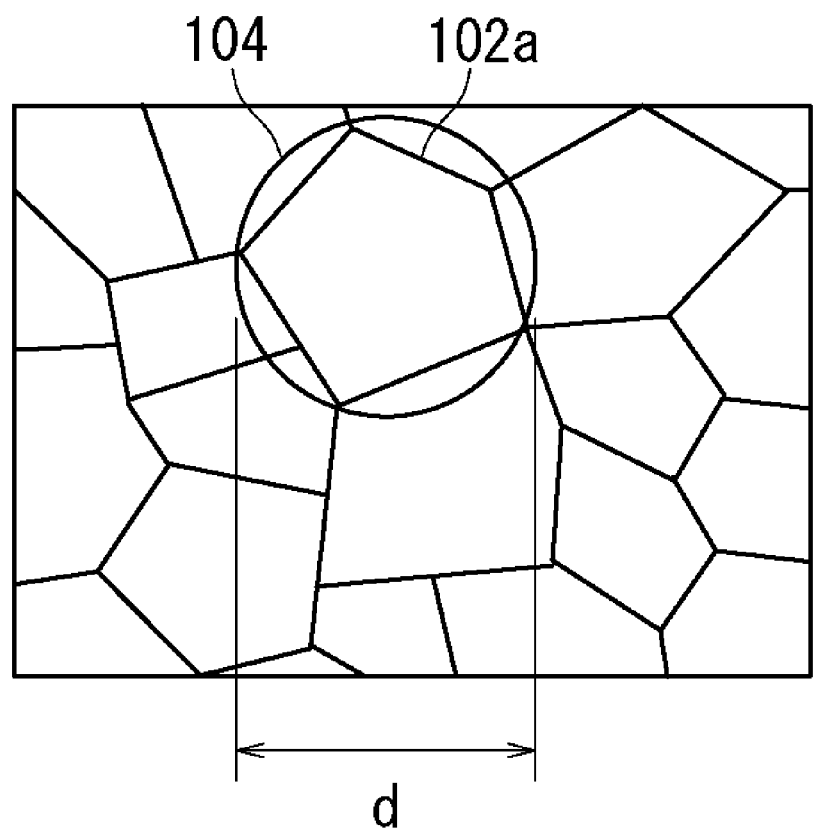
FIG. 4 is an explanatory view showing a method for measuring a grain size distribution.

An example of the average grain diameter calculation is shown in FIG. 3. When the numbers of grains 102 on a straight line 100 having a unit length L (e.g. 500 μm) in three different areas are 22, 23, 19, respectively, the average grain diameter D is 29.9 μm based on the above calculation equation $D=(4/\pi)\times[500/\{(22+23+19)/3\}]=29.9$ μm.

[Grain Size Distribution Measurement Method]

The grain size distribution is measured according to the following procedure.

(1) A micrograph of a surface of the sintered body is taken (100 to 200 magnifications), and the diameter of the circumscribed circle of each grain is measured as the grain diameter. For example, as shown in FIG. 4, the diameter d of the circumscribed circle 104 of a grain 102a is considered as the grain diameter of the grain 102a.

(2) The grain diameters of all the grains in the evaluation range are measured to evaluate the grain size distribution.

(3) The evaluation range has an area of 0.3 to 0.5 $mm^2$.

[Microscopic Pore Number Measurement Method]

The microscopic pore number is measured according to the following procedure.

(1) A micrograph of a cross section of the sintered body is taken (100 to 200 magnifications).

(2) The number of microscopic pores having a size of 5 μm or less in the evaluation range is measured, and it is divided by the area of the evaluation range to obtain the number per unit area.

(3) The evaluation range has an area of 0.3 to 0.5 $mm^2$.

[In-Line Transmittance Measurement Method]

Figure 5:
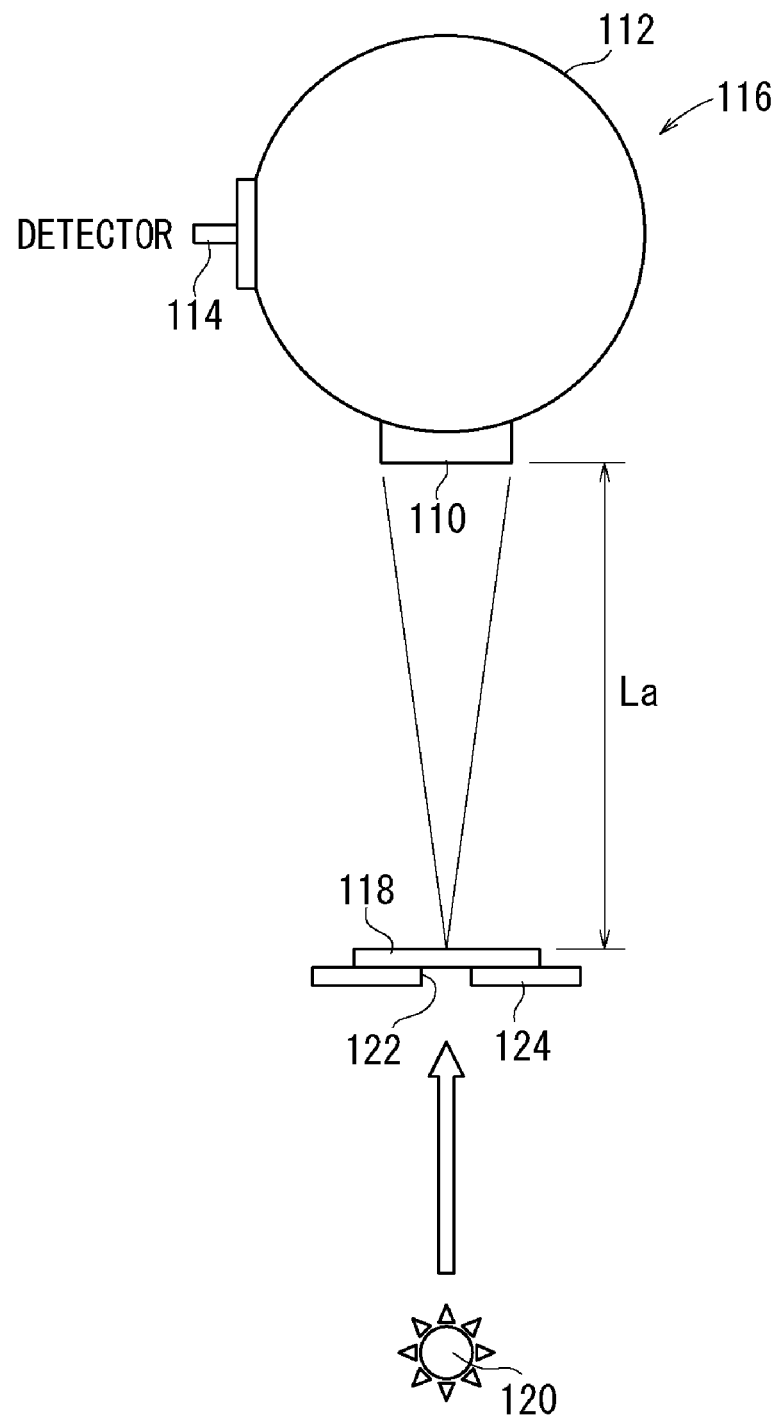
FIG. 5 is an explanatory view showing a method for measuring an in-line transmittance.

As shown in FIG. 5, the in-line transmittance was measured using a spectrophotometer 116 having a detector 114 and an integrating sphere 112 with an entrance 110 (Spectrophotometer U-4100 manufactured by Hitachi High-Technologies Corporation). A sample 118 (the sintered body) having a length of 10 mm, a width of 10 mm, and a thickness of 0.5 mm was prepared, and both surfaces (the entrance and exit surfaces) of the sample 118 were mirror-polished such that the surfaces had a roughness Ra of 0.04 to 0.06 μm.

A light source 120 and the integrating sphere 112 were placed such that the entrance 110 of the integrating sphere 112 faced the light source 120, and a slit plate 124 having a through-hole 122 was disposed therebetween. The sample 118 was fixed to the surface of the slit plate 124 facing the integrating sphere 112, to close the through-hole 122. The measurement wavelength of the spectrophotometer 116 was 175 to 2600 nm, and thus a visible light with a wavelength 360 to 830 nm was emitted from the light source 120. The entrance 110 of the integrating sphere 112 had a diameter of approximately 9 mm, the through-hole 122 of the slit plate 124 had a diameter of 2 mm, and a distance La between the sample 118 and the entrance 110 of the integrating sphere 112 were approximately 90 mm.

The visible light was transmitted through the sample 118 and collected by the integrating sphere 112, and the intensity I of the collected light was measured. Further, the visible light was emitted and collected without the sample 118, and the intensity $I_0$ of the collected light was measured. The in-line transmittance was obtained from the ratio $I/I_0$.

[Total Light Transmittance Measurement Method]

Figure 6:
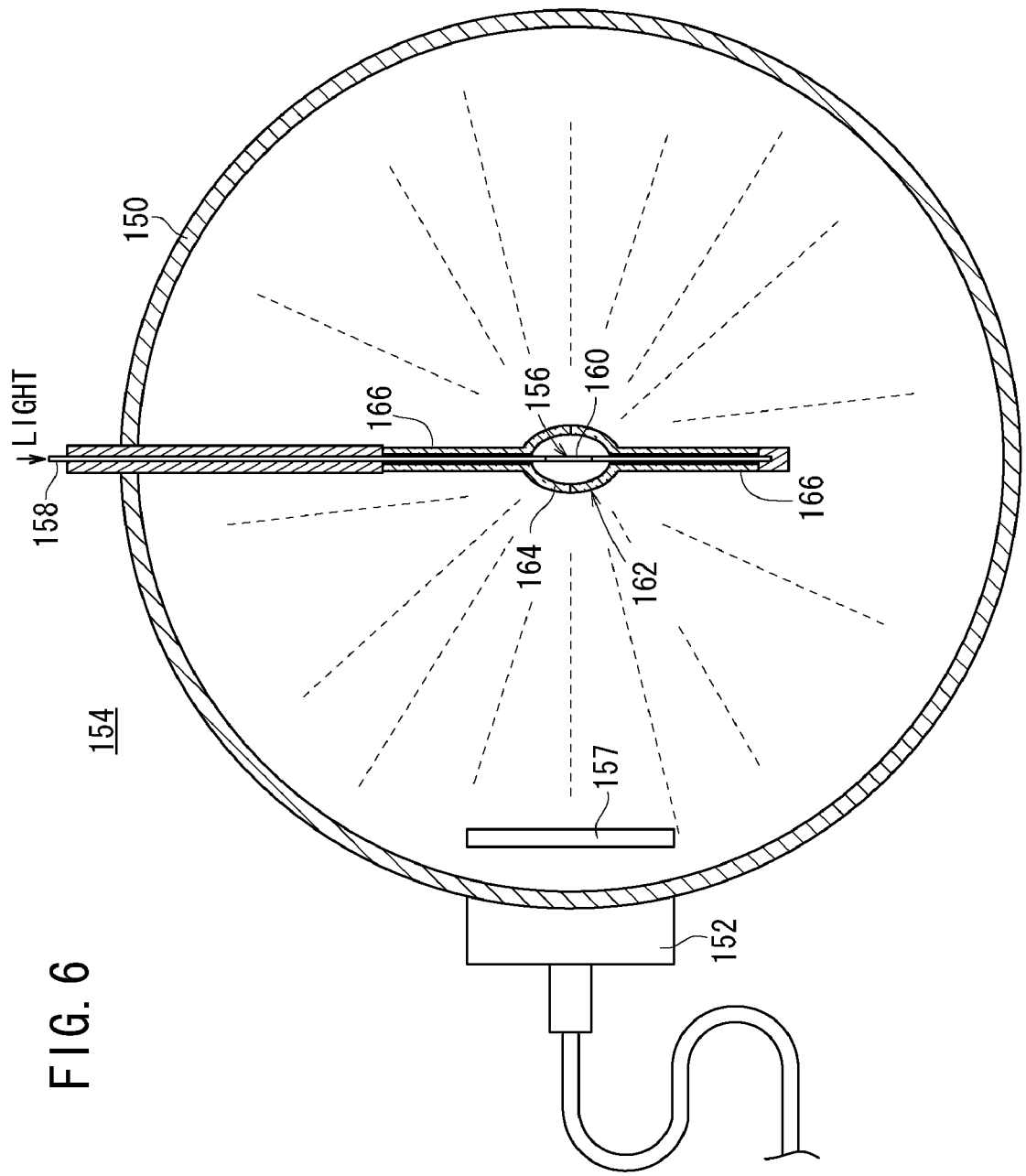
FIG. 6 is an explanatory view showing a method for measuring a total light transmittance.

As shown in FIG. 6, the total light transmittance was measured using a measurement apparatus 154 having an integrating sphere 150 and a detector 152, equal to those of the spectrophotometer 116 used in the above in-line transmittance measurement. In the measurement apparatus 154, a light source 156 and a light-shielding plate 157 are placed in the integrating sphere 150. The light source 156 has an optical fiber 158 for introducing a light from an external halogen lamp into the integrating sphere 150, and the light is scattered by forming a scratch 160 on a part of the outer surface of the optical fiber 158.

Cylindrical electrode inserts 166 each having an outer diameter of 2 mm, an inner diameter of 0.8 mm, and a length of 12 mm were formed at both sides of an oval spherical light-emitting portion 164 having a maximum outer diameter of 4 mm, a maximum inner diameter of 3 mm, and a length of 6 mm, to prepare an arc tube having a total length of 30 mm as a sample 162 (the sintered body). The sample 162 was fixed to cover the light source 156 in the integrating sphere 150. The detector 152 was sensitive to a visible light within a wavelength of 360 to 830 nm. The integrating sphere 150 had an inner diameter of ϕ52 mm, and the light source 156 had a diameter of 0.5 mm and a length of 3 mm.

The visible light was transmitted through the sample 162 and collected by the integrating sphere 150, and the intensity I of the collected light was measured. Further, the visible light was emitted and collected without the sample 162, and the intensity $I_0$ of the collected light was measured. The total light transmittance was obtained from the ratio $I/I_0$.

[Bending Strength Measurement Method]

The bending strength of the sintered body was measured in accordance with JIS R 1601 of "Testing method for flexural strength (modulus of rupture) of fine ceramics at room temperature".

A sintered body production method according to the embodiment will be described below with reference to FIG. 7.

Figure 7:
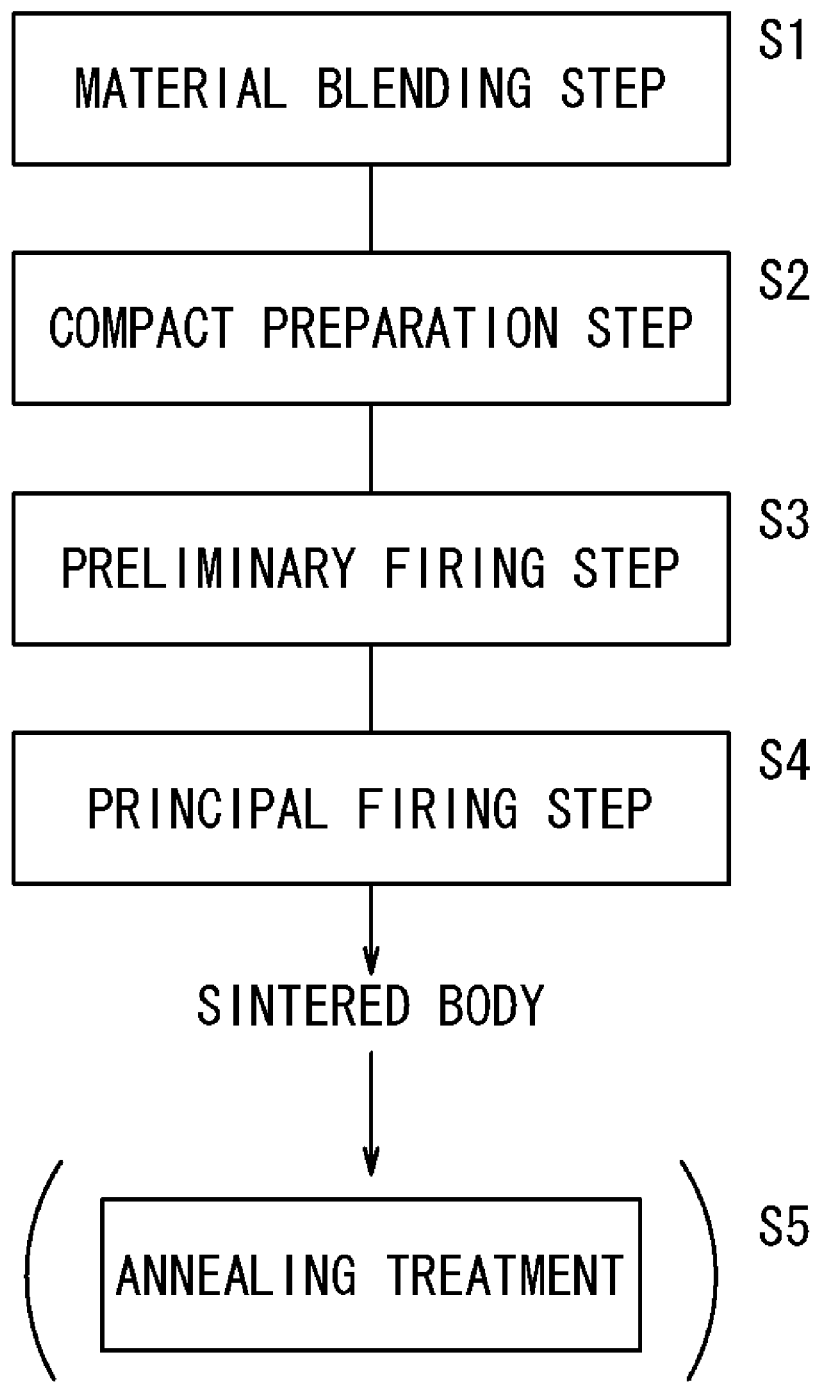
FIG. 7 is a block process chart of a sintered body production method according to the embodiment.

As shown in FIG. 7, the method of the embodiment contains a material blending step S1 of mixing a main component and an additive to prepare a mixture, a compact preparation step S2 of forming the mixture to prepare a compact, a preliminary firing step S3 of subjecting the compact to a preliminary firing treatment to prepare a sintered body precursor, and a principal firing step S4 of subjecting the sintered body precursor to a principal firing treatment to produce the sintered body.

In the material blending step S1, the main component of an alumina powder is mixed with powders of MgO (or an equivalent MgO precursor such as magnesium nitrate), $ZrO_2$ (or an equivalent $ZrO_2$ precursor), and $Y_2O_3$ (or an equivalent $Y_2O_3$ precursor). The $Y_2O_3$ and $ZrO_2$ are preferably added in the form of a partially stabilized zirconia (PSZ) material. The alumina is in the alpha phase state in the mixture. In this embodiment, it is preferred that the mixture further contains $SiO_2$ (silica), $Na_2O$ (sodium oxide), and $K_2O$ (potassium oxide).

In the compact preparation step, thus obtained mixture is formed to prepare the compact. For example, in the case of producing a sintered body for a metal halide lamp, the mixture may be formed by connecting and forming two parts as disclosed in Japanese Laid-Open Patent Publication Nos. 2009-530127 (PCT) and 2008-044344, or by integral forming using a molding core as disclosed in Domestic Re—Publication of PCT Patent Application Nos. 2002-085590 and 2005-028170, or by assembling and forming pressed or extruded cylindrical parts as disclosed in Japanese Laid-Open Patent Publication No. 10-125230. In the case of producing a sintered body for a high-pressure sodium vapor lamp, the mixture may be formed by pressing spray-dried powder as disclosed in Japanese Laid-Open Patent Publication No. 2004-269290. Thus, the mixture may be formed by using an extrusion forming method, a press forming method, or a gel casting method. The gel casting method is preferred because the compact prepared by the extrusion or press forming method often has a nonuniform density distribution causing deformation easily in the subsequent drying or firing process.

In the case of using the gel casting method, a slurry is prepared by mixing at least a solvent, a gelling agent, and a ceramic powder containing the main component (the alumina) and the additives (MgO, $ZrO_2$, $Y_2O_3$, etc.) as the mixture in the material blending step. The slurry is cast into a mold and then hardened to prepare the compact in the compact preparation step. Since the slurry can be poured and hardened directly in the mold, the gel casting method is advantageous in that the compact can be prepared in a complicated shape corresponding to the mold without the nonuniform density distribution and deformation.

In the preliminary firing step, the compact is subjected to the preliminary firing treatment in an oxidative atmosphere (at a temperature of 1000° C. to 1400° C. for 1 to 18 hours), to decompose and remove an organic binder in the compact. The sintered body precursor is prepared in this step.

In the subsequent principal firing step, the sintered body precursor is fired at a temperature of 1700° C. to 2000° C. in a hydrogen atmosphere or vacuum. The amount of the MgO added in the material blending step may be reduced in the subsequent high-temperature steps. In this embodiment, part of the MgO in the mixture is purposefully removed. Then, the principal firing treatment is carried out multiple times, so that the MgO content of the sintered body precursor is reduced to ⅔ or less of the initial MgO content used in the material blending step. At a high MgO content, the ceramic grains are advantageously grown to approximately uniform sizes though the growth rate is lowered. On the other hand, at a low MgO content, the ceramic grains are disadvantageously grown to nonuniform sizes though the growth rate is increased. Therefore, in this embodiment, the ceramic grains are grown to approximately uniform sizes, though small in the early principal firing treatment due to the high MgO content used in the material blending step, and the MgO content is gradually lowered to increase the growth rate in the subsequent principal firing treatments, whereby the resultant sintered body has approximately uniform grain sizes with the desired average grain diameter (35 to 70 μm, preferably 50 to 60 μm). As a result, the grain size distribution of the sintered body can be such that the number ratio of the above described small grains (the grains having a grain diameter equal to or smaller than ½ of the average grain diameter) is 40% or less and the number ratio of the above described large grains (the grains having a grain diameter equal to or larger than 3⁄2 of the average grain diameter) is 5% or more and 15% or less, more preferably such that the number ratio of the small grains is 30% or less and the number ratio of the large grains is 10% or more and 15% or more.

The total light transmittance of the sintered body can be further improved without deterioration of the in-line transmittance by subjecting the sintered body to an annealing treatment in the air at a temperature of 1100° C. to 1600° C. (in a step S5 shown in parentheses in FIG. 7). It is preferred that the sintered body has a higher total light transmittance from the viewpoint of the lamp efficiency.

The above formed compact may be calcined at 600° C. to 900° C. to decompose and remove the organic binder, and the resultant may be pulverized to obtain an alumina powder. Thus obtained alumina powder may be used as a part of the starting material powder. The physical properties of the alumina powder are changed by the formation, calcination, and pulverization, and the obtained alumina powder acts as a seed crystal or the like in the firing step. Thus, the growth rate nonuniformity is reduced in the firing step, thereby resulting in the uniform grain size.

The slurry and the gelling agent contained therein (a thermohardening resin precursor), which are prepared in the material blending step S1 and used in the gel casting method in the compact preparation step S2, will be described below.

[Slurry]

The slurry contains an inorganic component such as alumina, magnesia, zirconia, or yttria, and may contain an organic compound for inducing a chemical reaction of a gelling agent molecule with a dispersing agent molecule or another gelling agent molecule.

The slurry contains an organic dispersion medium and the gelling agent in addition to the inorganic component powder, and may further contain a dispersing agent or catalyst for controlling the viscosity or solidification. It is particularly preferred that the organic dispersion medium has a reactive functional group though the medium may have no reactive functional groups, The organic dispersion medium having the reactive functional group will be described below.

The organic dispersion medium having the reactive functional group should satisfy the following two conditions. Thus, the medium should be a liquid substance that can be chemically bonded to the gelling agent to solidify the slurry and can provide the slurry with a high fluidity suitable for casting.

The organic dispersion medium can be chemically bonded to the gelling agent to solidify the slurry when it has a functional group capable of forming a chemical bond with the gelling agent (such as a hydroxyl, carboxyl, or amino group) in the molecule. The organic dispersion medium may have at least one reactive functional group, and it is preferred that the dispersion medium has two or more reactive functional groups to more sufficiently solidify the slurry. Examples of the liquid substances having two or more reactive functional groups include polyols and polybasic acids. The two or more reactive functional groups in one molecule may be the same or different groups. The medium may be a substance having a large number of the reactive functional groups such as a polyglycerol.

In view of preparing the slurry with a high fluidity suitable for casting, the organic dispersion medium preferably has a lower viscosity, and particularly preferably has a viscosity of 20 cps or less at 20° C. Some of the above described polyols and polybasic acids have high viscosity due to formation of hydrogen bonds. Such polyols and polybasic acids are not suitable as the reactive dispersion medium even if they can act to solidify the slurry. Therefore, an ester having two or more ester groups (such as a polybasic acid ester or a polyol-acid ester) is preferably used as the organic dispersion medium. In a case where a small amount of the polyol or polybasic acid does not act to greatly increase the viscosity of the slurry, it can be effectively used for improving the strength. The ester is relatively stable but can be sufficiently reacted with a highly reactive gelling agent, and has a low viscosity, and thereby can satisfy the above two conditions. Particularly an ester having a total carbon number of 20 or less can be preferably used as the reactive dispersion medium because of its low viscosity.

Specific examples of the organic dispersion media having the reactive functional group useful for the slurry include nonionic esters, alcohol-ethylene oxides, amine condensates, nonionic special amide compounds, modified polyester compounds, carboxyl-containing polymers, polyanionic polymaleic acids, polycarboxylate esters, nonionic multichain polymers, phosphate esters, sorbitan fatty acid esters, sodium alkylbenzene sulfonates, and maleic compounds. Examples of non-reactive dispersion media include hydrocarbons, ethers, and toluene.

The slurry may be prepared by (a) the steps of dispersing the inorganic powder in the dispersion medium and then adding the gelling agent or by (b) the steps of simultaneously adding the inorganic powder and the gelling agent to the dispersion medium and then dispersing the components.

In view of workability in the casting or the like, the viscosity of the slurry is preferably 30000 cps or less, more preferably 20000 cps or less, at 20° C. The viscosity of the slurry can be controlled by selecting the viscosities of the above reactive dispersion medium and the gelling agent, and also by selecting the type of the powder, the amount of the dispersing agent, and the concentration of the slurry (the volume ratio % of the powder to the entire slurry).

In general, the concentration of the slurry is preferably 25% to 75% by volume. In view of reducing cracking due to dry shrinkage, the concentration is more preferably 35% to 75% by volume. The slurry may contain the dispersion medium, the dispersing agent, a hardener, and a reaction catalyst as organic components. For example, the slurry is solidified by a chemical reaction of a gelling agent molecule with a dispersion medium molecule or another gelling agent molecule.

The slurry may contain an additive such as an antifoam, a surfactant, a sintering aid, a catalyst, a plasticizer, or an agent for improving a property, in addition to the above described components.

[Gelling Agent in Slurry (Thermohardening Resin Precursor)]

The gelling agent is reacted with the reactive functional group of the dispersion medium to solidify the slurry. The gelling agent will be described below.

The gelling agent preferably has a viscosity of 3000 cps or less at 20° C. Specifically, the gelling agent preferably has an isocyanate group and/or an isothiocyanate group, and it is preferably chemical-bonded to the organic dispersion medium having two or more ester groups to solidify the slurry.

Specifically, the reactive gelling agent is a substance that can be chemically bonded to the dispersion medium to solidify the slurry. Therefore, the gelling agent has an intramolecular reactive functional group that can be chemically reacted with the dispersion medium. For example, the gelling agent may be a monomer, an oligomer, a prepolymer that can be three-dimensionally crosslinked by a crosslinking agent (such as a polyvinyl alcohol, an epoxy resin, or a phenolic resin), etc.

It is preferred from the viewpoint of ensuring a sufficient fluidity of the slurry that the reactive gelling agent has a low viscosity. Specifically, the viscosity of the gelling agent is preferably 3000 cps or less at 20° C.

In general, prepolymers and polymers with high average molecular weights are high in viscosity. Thus, in this embodiment, the gelling agent is preferably a monomer or oligomer having a lower molecular weight (specifically an average molecular weight of 2000 or less measured by a GPC method). It should be noted that the above described viscosity is not the viscosity of a commercially available diluted solution of the gelling agent (such as an aqueous solution of the gelling agent), but the viscosity of the gelling agent per se (the viscosity of 100% pure gelling agent).

It is preferred that the reactive functional group of the gelling agent is appropriately selected in view of the reaction with the reactive dispersion medium. For example, in the case of using a relatively low-reactive ester as the reactive dispersion medium, the gelling agent preferably has a high-reactive group such as an isocyanate group (—N=C=O) and/or an isothiocyanate group (—N=C=S).

The isocyanate is generally reacted with a diol or diamine. However, the diol is generally high in viscosity as described above. The diamine has an excessively high reactivity, and the slurry using the diamine is often solidified before the casting.

Also from the viewpoints, it is preferred that the slurry is solidified by a reaction between the reactive ester dispersion medium and the gelling agent having an isocyanate group and/or an isothiocyanate group. To achieve more sufficient solidification, it is further preferred that the slurry is solidified by a reaction between the reactive dispersion medium having two or more ester groups and the gelling agent having an isocyanate group and/or an isothiocyanate group. In a case where a small amount of the diol or diamine does not act to greatly increase the viscosity of the slurry, it can be effectively used for improving the strength.

Examples of the gelling agents having an isocyanate group and/or an isothiocyanate group include MDI (4,4'-diphenylmethane diisocyanate) based agents (resins), HDI (hexamethylene diisocyanate) based agents (resins), TDI (tolylene diisocyanate) based agents (resins), IPDI (isophorone diisocyanate) based agents (resins), and isothiocyanates (resins).

In view of the chemical properties such as the compatibility with the reactive dispersion medium, it is preferred that another functional group is cast to the above chemical base structure. For example, in the case of using the reactive ester dispersion medium, it is preferred that the compatibility of the gelling agent with the ester is increased to improve the uniformity of the slurry by introducing a hydrophilic functional group to the gelling agent.

The gelling agent may have an intramolecular reactive functional group other than the isocyanate and isothiocyanate groups, and may have both the isocyanate and isothiocyanate groups. The gelling agent may be a substance having a large number of reactive functional groups such as a polyisocyanate.

EXAMPLES

Experiment examples for evaluating the average grain diameter, in-line transmittance, total light transmittance, bending strength, cracking, etc. of each sintered body according to Examples 1 to 10, Comparative Examples 1 to 3, and Reference Example will be described below. The conditions and evaluation results of Examples 1 to 10, Comparative Examples 1 to 3, and Reference Example are shown in Tables 1 to 3.

Example 1

A slurry was prepared by mixing the following components.
(Raw Material Powder)
  100 parts by weight of an α-alumina powder having a specific surface area of 3.5 to 4.5 m$^2$/g and an average primary grain diameter of 0.35 to 0.45 μm
  0.025 parts by weight of MgO (magnesia)
  0.040 parts by weight of $ZrO_2$ (zirconia)
  0.0015 parts by weight of $Y_2O_3$ (yttria)
(Dispersion Medium)
  27 parts by weight of dimethyl glutarate
  0.3 parts by weight of ethylene glycol
(Gelling Agent)
  4 parts by weight of an MDI resin
(Dispersing Agent)
  3 parts by weight of a macromolecular surfactant
(Catalyst)
  0.1 part by weight of N,N-dimethylaminohexanol The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain plate-shaped and rod-shaped powder compacts.

Each of the obtained powder compacts was calcined (preliminary-fired) at 1100° C. in the air, and fired twice at 1800° C. in a hydrogen/nitrogen (¾) atmosphere, to increase the density and translucency of the compact. Thus, a plate-shaped sintered body having a size of 10 mm×10 mm×1 mm, an arc tube-shaped sintered body having a total length of 30 mm, and a rod-shaped sintered body having a size of 3 mm×4 mm×40 mm were produced in this manner. The arc tube-shaped sintered body had an oval spherical light-emitting portion and cylindrical electrode inserts formed at both sides thereof. The oval spherical light-emitting portion had a maximum outer diameter of ϕ 4 mm, a maximum inner diameter of ϕ 3 mm, and a length of 6 mm, and the cylindrical electrode inserts each had an outer diameter of ϕ 2 mm, an inner diameter of ϕ 0.8 mm, and a length of 12 mm.

The average grain diameter of each sintered body was measured by the above described average grain diameter calculation method. As a result, the sintered body had an average grain diameter of 50 μm. Further, the grain diameter distribution of each sintered body was measured by the above described grain size distribution measurement method. As a result, the number ratio of the small grains having a grain diameter equal to or smaller than 25 μm (½ of the average grain diameter) was 27%, and the number ratio of the large grains having a grain diameter of 75 μm (3⁄2 of the average grain diameter) or larger was 6%.

The MgO, $ZrO_2$, and $Y_2O_3$ contents in each sintered body were 80, 400, and 9 ppm, respectively.

The both surfaces of the plate-shaped sintered body were polished by a diamond slurry to obtain a sample having a surface roughness Ra of 0.05 μm. The in-line transmittance of the sample was measured by the above described in-line transmittance measurement method. As a result, the sample had a light transmittance of 64.1% at a wavelength of 600 nm. Further, the maximum and minimum transmittance values of the sample were 66.0% and 59.0% respectively in the visible region of 360 to 830 nm, and thus the sample had such a transmittance variation that the ratio of the maximum to minimum was 1.1.

The arc tube-shaped sintered body had a total light transmittance of 85%.

Furthermore, the bending strength of the rod-shaped sintered body was measured by a method according to JIS R 1601. As a result, the rod-shaped sintered body had a bending strength of 300 MPa.

Example 2

A slurry was prepared in the same manner as Example 1 except for using 0.0030 parts by weight of $Y_2O_3$.

The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain plate-shaped and rod-shaped powder compacts.

Each of the obtained powder compacts was calcined at 1100° C. in the air, and fired twice at 1800° C. in a hydrogen/nitrogen (¾) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 50 μm. Further, the grain diameter distribution of each sintered body was measured by the above described grain size distribution measurement method. As a result, the number ratio of the small grains having a grain diameter equal to or smaller than 25 μm (½ of the average grain diameter) was 35%, and the number ratio of the large grains having a grain diameter of 75 μm (3/2 of the average grain diameter) or larger was 5%.

The MgO, ZrO$_2$, and Y$_2$O$_3$ contents in each sintered body were 80, 400, and 30 ppm respectively.

The both surfaces of the plate-shaped sintered body were polished by a diamond slurry to obtain a sample having a surface roughness Ra of 0.05 μm. The in-line transmittance of the sample was measured by the above described in-line transmittance measurement method. As a result, the sample had a light transmittance of 49.9% at a wavelength of 600 nm. Further, the maximum and minimum transmittance values of the sample were 51.3% and 45.9% respectively in the visible region of 360 to 830 nm, and thus the sample had such a transmittance variation that the ratio of the maximum to minimum was 1.1.

The arc tube-shaped sintered body had a total light transmittance of 85%.

Furthermore, the bending strength of the rod-shaped sintered body was measured by a method according to JIS R 1601. As a result, the rod-shaped sintered body had a bending strength of 300 MPa.

Example 3

A slurry was prepared in the same manner as Example 1 except for using 0.0045 parts by weight of SiO$_2$ (silica), 0.003 parts by weight of Na$_2$O (sodium oxide), and 0.002 parts by weight of K$_2$O (potassium oxide) in addition to the components of Example 1.

The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain plate-shaped and rod-shaped powder compacts.

Each of the obtained powder compacts was calcined at 1100° C. in the air, and fired once at 1800° C. in a hydrogen/nitrogen (3/1) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 35 μm. Further, the grain diameter distribution of each sintered body was measured by the above described grain size distribution measurement method. As a result, the number ratio of the small grains having a grain diameter equal to or smaller than 17.5 μm (1/2 of the average grain diameter) was 36%, and the number ratio of the large grains having a grain diameter of 52.5 μm (3/2 of the average grain diameter) or larger was 5%.

The MgO, ZrO$_2$, and Y$_2$O$_3$ contents in each sintered body were 100, 400, and 15 ppm respectively.

The both surfaces of the plate-shaped sintered body were polished by a diamond slurry to obtain a sample having a surface roughness Ra of 0.05 μm. The in-line transmittance of the sample was measured by the above described in-line transmittance measurement method. As a result, the sample had a light transmittance of 56.9% at a wavelength of 600 nm. Further, the maximum and minimum transmittance values of the sample were 59.2% and 52.5% respectively in the visible region of 360 to 830 nm, and thus the sample had such a transmittance variation that the ratio of the maximum to minimum was 1.1.

The arc tube-shaped sintered body had a total light transmittance of 85%.

Furthermore, the bending strength of the rod-shaped sintered body was measured by a method according to JIS R 1601. As a result, the rod-shaped sintered body had a bending strength of 310 MPa.

Example 4

A slurry was prepared in the same manner as Example 1.

The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain plate-shaped and rod-shaped powder compacts.

Each of the obtained powder compacts was calcined at 1100° C. in the air, and fired once at 1800° C. in a hydrogen/nitrogen (3/1) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 35 μm. Further, the grain diameter distribution of each sintered body was measured by the above described grain size distribution measurement method. As a result, the number ratio of the small grains having a grain diameter equal to or smaller than 17.5 μm (1/2 of the average grain diameter) was 36%, and the number ratio of the large grains having a grain diameter of 52.5 μm (3/2 of the average grain diameter) or larger was 5%.

The MgO, ZrO$_2$, and Y$_2$O$_3$ contents in each sintered body were 150, 400, and 15 ppm respectively.

The both surfaces of the plate-shaped sintered body were polished by a diamond slurry to obtain a sample having a surface roughness Ra of 0.05 μm. The in-line transmittance of the sample was measured by the above described in-line transmittance measurement method. As a result, the sample had a light transmittance of 45.1% at a wavelength of 600 nm. Further, the maximum and minimum transmittance values of the sample were 49.7% and 38.3% respectively in the visible region of 360 to 830 nm, and thus the sample had such a transmittance variation that the ratio of the maximum to minimum was 1.3.

The arc tube-shaped sintered body had a total light transmittance of 85%.

Furthermore, the bending strength of the rod-shaped sintered body was measured by a method according to JIS R 1601. As a result, the rod-shaped sintered body had a bending strength of 320 MPa.

Example 5

A slurry was prepared in the same manner as Example 1.

The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain plate-shaped and rod-shaped powder compacts.

Each of the obtained powder compacts was calcined at 1100° C. in the air, and fired three times at 1800° C. in a hydrogen/nitrogen (3/1) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 60 μm. Further, the grain diameter distribution of each sintered body was measured by the above described grain size distribution measurement method. As a result, the number ratio of the small grains having a grain diameter equal to or smaller than 30 μm (½ of the average grain diameter) was 28%, and the number ratio of the large grains having a grain diameter of 90 μm (3/2 of the average grain diameter) or larger was 7%.

The MgO, $ZrO_2$, and $Y_2O_3$ in sintered body were 80, 400, and 15 ppm, respectively.

The both surfaces of the plate-shaped sintered body were polished by a diamond slurry to obtain a sample having a surface roughness Ra of 0.05 μm. The in-line transmittance of the sample was measured by the above described in-line transmittance measurement method. As a result, the sample had a light transmittance of 65.2% at a wavelength of 600 nm. Further, the maximum and minimum transmittance values of the sample were 65.7% and 58.7% respectively in the visible region of 360 to 830 nm, and thus the sample had such a transmittance variation that the ratio of the maximum to minimum was 1.1.

The arc tube-shaped sintered body had a total light transmittance of 85%.

Furthermore, the bending strength of the rod-shaped sintered body was measured by a method according to JIS R 1601. As a result, the rod-shaped sintered body had a bending strength of 280 MPa.

Example 6

A slurry was prepared in the same manner as Example 1.

The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain plate-shaped and rod-shaped powder compacts.

Each of the obtained powder compacts was calcined at 1100° C. in the air, and fired four times at 1800° C. in a hydrogen/nitrogen (3/1) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 70 μm. Further, the grain diameter distribution of each sintered body was measured by the above described grain size distribution measurement method. As a result, the number ratio of the small grains having a grain diameter equal to or smaller than 35 μm (½ of the average grain diameter) was 40%, and the number ratio of the large grains having a grain diameter of 105 μm (3/2 of the average grain diameter) or larger was 5%.

The MgO, $ZrO_2$, and $Y_2O_3$ contents in each sintered body were 60, 400, and 15 ppm respectively.

The both surfaces of the plate-shaped sintered body were polished by a diamond slurry to obtain a sample having a surface roughness Ra of 0.05 μm. The in-line transmittance of the sample was measured by the above described in-line transmittance measurement method. As a result, the sample had a light transmittance of 66.3% at a wavelength of 600 nm. Further, the maximum and minimum transmittance values of the sample were 77.4% and 55.3% respectively in the visible region of 360 to 830 nm, and thus the sample had such a transmittance variation that the ratio of the maximum to minimum was 1.4.

The arc tube-shaped sintered body had a total light transmittance of 85%.

Furthermore, the bending strength of the rod-shaped sintered body was measured by a method according to JIS R 1601. As a result, the rod-shaped sintered body had a bending strength of 250 MPa.

Examples 7 to 10

Arc tube-shaped sintered body were produced in the same manner as Example 1, and were annealed in the air at 1100° C., 1240° C., 1340° C., or 1600° C., respectively. The total light transmittances of the sintered bodies were 88%, 89%, 90%, and 97%, respectively.

Comparative Example 1

100 parts by weight of an α-alumina powder having a specific surface area of 3.5 to 4.5 m²/g and an average primary grain diameter of 0.35 to 0.45 μm, 0.025 parts by weight of MgO (magnesia), 0.040 parts by weight of $ZrO_2$ (zirconia), 0.0015 parts by weight of $Y_2O_3$ (yttria), 0.5 parts by weight of a polyethylene glycol, and 50 parts by weight of water were pulverized and mixed for 1 hour using a ball mill. The resultant mixture was dried at about 200° C. by a spray dryer to obtain a granulated powder having an average grain diameter of approximately 70 μm.

The granulated powder was press-formed under a pressure of 2000 kgf/cm² to obtain plate-shaped and rod-shaped powder compacts.

Each of the obtained powder compacts was calcined at 1100° C. in the air, and fired once at 1800° C. in a hydrogen/nitrogen (3/1) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 25 μm.

The both surfaces of the plate-shaped sintered body were polished by a diamond slurry to obtain a sample having a surface roughness Ra of 0.05 μm. The in-line transmittance of the sample was measured by the above described in-line transmittance measurement method. As a result, the sample had a light transmittance of 29.9% at a wavelength of 600 nm. Further, the maximum and minimum transmittance values of the sample were 33.3% and 27.6% respectively in the visible region of 360 to 830 nm, and thus the sample had such a transmittance variation that the ratio of the maximum to minimum was 1.2.

Furthermore, the bending strength of the rod-shaped sintered body was measured by a method according to JIS R 1601. As a result, the rod-shaped sintered body had a bending strength of 300 MPa.

The above sample had the in-line transmittance of less than 30%, and thereby was not usable as a desired sintered body having an in-line transmittance of 30% or more. Therefore, the MgO, $ZrO_2$, and $Y_2O_3$ contents and the total light transmittance were not evaluated in this example.

Comparative Example 2

A slurry was prepared in the same manner as Example 1.

The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain a plate-shaped powder compact and a rod-shaped powder compact.

Each of the obtained powder compacts was calcined at 1100° C. in the air, and fired five times at 1800° C. in a hydrogen/nitrogen (3/1) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 75 µm. The grain size distribution of the sintered grains was measured by the above described grain size distribution method. As a result, the number ratio of the grains having a grain size of 112.5 µm or larger, which is equal to 3/2 of the average grain diameter, was 16%.

The sintered bodies had vast numbers of microcracks, and thereby were not usable as a desired sintered body having no cracks. Therefore, the MgO, $ZrO_2$, and $Y_2O_3$ contents, the in-line transmittance, the total light transmittance, and the bending strength were not evaluated in this example.

Comparative Example 3

A slurry was prepared by mixing the following components.
(Raw Material Powder)
100 parts by weight of an α-alumina powder having a specific surface area of 9 to 15 $m^2/g$ and an average primary grain diameter of 0.1 to 0.3 µm
    0.025 parts by weight of MgO (magnesia)
    0.040 parts by weight of $ZrO_2$ (zirconia)
    0.0015 parts by weight of $Y_2O_3$ (yttria)
(Dispersion Medium)
    27 parts by weight of dimethyl glutarate
    0.3 parts by weight of ethylene glycol
(Gelling Agent)
    4 parts by weight of an MDI resin
(Dispersing Agent)
    3 parts by weight of a macromolecular surfactant
(Catalyst)
    0.1 parts by weight of N,N-dimethylaminohexanol The slurry was cast into an aluminum alloy mold at the room temperature. The slurry was left in the mold at the room temperature for 1 hour and at 40° C. for 30 minutes to perform solidification. The resultant solid was separated from the mold, and was let stand at the room temperature for 2 hours and at 90° C. for 2 hours, to obtain a plate-shaped powder compact and a rod-shaped powder compact.

Each of the obtained powder compacts was calcined at 1100° C. in the air, and fired once at 1800° C. in a hydrogen/nitrogen (3/1) atmosphere, to increase the density and translucency of the compact. Thus, a plate-shaped sintered body, an arc tube-shaped sintered body, and a rod-shaped sintered body, respectively having the same sizes as those of Example 1 were produced.

The average grain diameter of each sintered body was measured by the above described average grain diameter calculation method. As a result, the sintered body had an average grain diameter of 3 µm.

The both surfaces of the plate-shaped sintered body were polished by a diamond slurry to obtain a sample having a surface roughness Ra of 0.05 µm. The in-line transmittance of the sample was measured by the above described in-line transmittance measurement method. As a result, the sample had a light transmittance of 45.3% at a wavelength of 600 nm. Further, the maximum and minimum transmittance values of the sample were 64.5% and 17.3% respectively in the visible region of 360 to 830 nm, and thus the sample had such a transmittance variation that the ratio of the maximum to minimum was 3.7.

The above sample had the in-line transmittance variation of 3.7 (which was significantly larger than the upper limit 2), and thereby was not usable as a desired sintered body. Therefore, the MgO, $ZrO_2$, and $Y_2O_3$ contents, the total light transmittance, and the bending strength were not evaluated in this example.

Reference Example

An arc tube-shaped sintered body was produced in the same manner as Example 1, and was annealed at 1530° C. in a hydrogen ($H_2$) atmosphere. The sintered body had a total light transmittance of 85%, and the improvement observed in Examples 7 to 10 was not achieved in this example.

TABLE 1

| | | Example 1 | Example 2 | Example 3 | Example 4 | Example 5 |
|---|---|---|---|---|---|---|
| Forming Method | | Gel Casting | Gel Casting | Gel Casting | Gel Casting | Gel Casting |
| Component and Amount of Additives in Sintered Body (ppm) | MgO | 80 | 80 | 100 | 150 | 80 |
| | $ZrO_2$ | 400 | 400 | 400 | 400 | 400 |
| | $Y_2O_3$ | 10 | 30 | 15 | 15 | 15 |
| Annealing Treatment | | None | None | None | None | None |
| Grain Size | Average (µm) | 50 | 50 | 35 | 35 | 60 |
| | Number Ratio of 1/2 of Average or | 27% | 35% | 36% | 36% | 28% |

TABLE 1-continued

|  |  | Example 1 | Example 2 | Example 3 | Example 4 | Example 5 |
|---|---|---|---|---|---|---|
|  | Smaller Number Ratio of 3/2 of Average or Larger | 6% | 5% | 5% | 5% | 7% |
| In-Line Transmittance | Wavelength 600 nm | 64.1% | 49.9% | 56.9% | 45.1% | 65.2% |
|  | Maximum (360 to 830 nm) | 66.0% | 51.3% | 59.2% | 49.7% | 65.7% |
|  | Minimum (360 to 830 nm) | 59.0% | 45.9% | 52.5% | 38.3% | 58.7% |
|  | Maximum/ Minimum | 1.1 | 1.1 | 1.1 | 1.3 | 1.1 |
| Total Light Transmittance |  | 85% | 85% | 85% | 85% | 85% |
| Bending Strength (MPa) |  | 300 | 300 | 310 | 320 | 280 |
| Cracks |  | None | None | None | None | None |

TABLE 2

|  |  | Example 6 | Example 7 | Example 8 | Example 9 | Example 10 |
|---|---|---|---|---|---|---|
| Forming Method |  | Gel Casting | Gel Casting | Gel Casting | Gel Casting | Gel Casting |
| Component and Amount of Additives in Sintered Body (ppm) | MgO | 60 | 80 | 80 | 80 | 80 |
|  | $ZrO_2$ | 400 | 400 | 400 | 400 | 400 |
|  | $Y_2O_3$ | 15 | 10 | 10 | 10 | 10 |
| Annealing Treatment |  | None | 1100° C. Air | 1240° C. Air | 1340° C. Air | 1600° C. Air |
| Grain Size | Average (μm) | 70 | 50 | 50 | 50 | 50 |
|  | Number Ratio of 1/2 of Average or Smaller | 40% | 27% | 27% | 27% | 27% |
|  | Number Ratio of 3/2 of Average or Larger | 5% | 6% | 6% | 6% | 6% |
| In-Line Transmittance | Wavelength 600 nm | 66.3% | 64.1% | 64.1% | 64.1% | 64.1% |
|  | Maximum (360 to 830 nm) | 77.4% | 66.0% | 66.0% | 66.0% | 66.0% |
|  | Minimum (360 to 830 nm) | 55.3% | 59.0% | 59.0% | 59.0% | 59.0% |
|  | Maximum/ Minimum | 1.4 | 1.1 | 1.1 | 1.1 | 1.1 |
| Total Light Transmittance |  | 85% | 88% | 89% | 90% | 97% |
| Bending Strength (MPa) |  | 250 | 300 | 300 | 300 | 300 |
| Cracks |  | None | None | None | None | None |

TABLE 3

|  |  | Comparative Example 1 | Comparative Example 2 | Comparative Example 3 | Reference Example |
|---|---|---|---|---|---|
| Forming Method |  | Pressing | Gel Casting | Gel Casting | Gel Casting |
| Component and Amount of | MgO | — | — | — | 80 |
|  | $ZrO_2$ | — | — | — | 400 |

TABLE 3-continued

| | | Comparative Example 1 | Comparative Example 2 | Comparative Example 3 | Reference Example |
|---|---|---|---|---|---|
| Additives in Sintered Body (ppm) | Y₂O₃ | — | — | — | 10 |
| Annealing Treatment | | None | None | None | 1530° C. H₂ |
| Grain Size | Average (μm) | 25 | 75 | 3 | 50 |
| | Number Ratio of 1/2 of Average or Smaller | — | — | — | 27% |
| | Number Ratio of 3/2 of Average or Larger | — | 16% | — | 6% |
| In-Line Transmittance | Wavelength 600 nm | 29.9% | — | 45.3% | 64.1% |
| | Maximum (360 to 830 nm) | 33.3% | — | 64.5% | 66.0% |
| | Minimum (360 to 830 nm) | 27.6% | — | 17.3% | 59.0% |
| | Maximum/Minimum | 1.2 | — | 3.7 | 1.1 |
| Total Light Transmittance | | — | — | — | 85% |
| Bending Strength (MPa) | | 300 | — | — | 300 |
| Cracks | | None | Observed | None | None |

[Evaluation]

In all of Examples 1 to 6, each 0.5-mm-thick plate-shaped sintered body had an in-line transmittance of 30% or more and further had a maximum to minimum in-line transmittance ratio of 2:1 to 1:1 in the visible region of 360 to 830 nm, each arc tube-shaped sintered body had a total light transmittance of 85% or more, and each rod-shaped sintered body had a bending strength of 250 MPa or more. It is clear from Examples 1 to 6 that when the sintered body has an average grain diameter of 35 to 70 μm, it exhibits the preferred properties.

Among Examples 1 to 6, the maximum to minimum in-line transmittance ratios of Example 4 (average grain diameter 35 μm) and Example 6 (average grain diameter 70 μm) were slightly larger than those of the other examples. It is clear from this that the average grain diameters of 50 to 60 μm used in Examples 1, 2, and 5 are more preferred.

Although the sintered bodies of Examples 3 and 4 had the same average grain diameter of 35 μm, the sintered body of Example 3 exhibited more excellent properties including a high in-line transmittance and a maximum to minimum in-line transmittance ratio of 1.1. This can be caused by the addition of the SiO₂ (silica), Na₂O (sodium oxide), and K₂O (potassium oxide) to the slurry. As a result of measurement, the sintered body of Example 3 contained 10 to 50 ppm of SiO₂, 10 to 50 ppm of Na₂O, and 10 to 50 ppm of K₂O, by weight.

Furthermore, the sintered bodies of Examples 7 to 10 had improved total light transmittances. Thus, it is confirmed that the annealing treatment is effective for the improvement, the air atmosphere is preferred for the annealing treatment, and the annealing temperature of 1100° C. to 1600° C. is preferable.

It is to be understood that the translucent polycrystalline sintered body, the translucent polycrystalline sintered body production method, and the arc tube for a high-intensity discharge lamp of the present invention are not limited to the above embodiments, and various changes and modifications may be made therein without departing from the scope of the present invention.

What is claimed is:

1. A translucent polycrystalline sintered body suitable for the manufacture of an arc tube for a high-intensity discharge lamp, comprising an alumina as a main component, and comprising, as additives, 30 to 200 ppm by weight of MgO, 200 to 1200 ppm by weight of ZrO₂ and 5 to 300 ppm by weight of Y₂O₃, wherein sintered grains forming the translucent polycrystalline sintered body have an average grain diameter of 35 to 70 μm.

2. A translucent polycrystalline sintered body according to claim 1, wherein a 0.5-mm-thick flat plate of the translucent polycrystalline sintered body has an in-line transmittance of 30% or more of light at a wavelength of 600 nm.

3. A translucent polycrystalline sintered body according to claim 1, wherein a 0.5-mm-thick flat plate of the translucent polycrystalline sintered body has a ratio of 2:1 to 1:1 between maximum and minimum in-line transmittance values in the visible region of 360 to 830 nm.

4. A translucent polycrystalline sintered body according to claim 1, wherein the translucent polycrystalline sintered body has a bending strength of 250 MPa or more.

5. A translucent polycrystalline sintered body according to claim 1, wherein the translucent polycrystalline sintered body has a total light transmittance of 85% or more.

6. A translucent polycrystalline sintered body according to claim 1, wherein a weight ratio of a total of ZrO₂ and Y₂O₃ to MgO is 1:1 to 50:1.

7. A translucent polycrystalline sintered body according to claim 1, wherein a weight ratio of Y₂O₃ to MgO is 1:1 to 1:40.

8. A translucent polycrystalline sintered body according to claim 1, comprising, as additives, 10 to 50 ppm by weight of $SiO_2$, 10 to 50 ppm by weight of $Na_2O$, and 10 to 50 ppm by weight of $K_2O$.

9. A translucent polycrystalline sintered body according to claim 1, wherein 40% or less of the sintered grains in the translucent polycrystalline sintered body have a grain diameter equal to or smaller than ½ of the average grain diameter.

10. A translucent polycrystalline sintered body according to claim 9, wherein 5% or more and 15% or less of the sintered grains in the translucent polycrystalline sintered body have a grain diameter equal to or larger than 3/2 of the average grain diameter.

11. A method for producing a translucent polycrystalline sintered body suitable for the manufacture of an arc tube for a high-intensity discharge lamp, the sintered body comprising an alumina as a main component, and comprising, as additives, 30 to 200 ppm by weight of MgO, 200 to 1200 ppm by weight of $ZrO_2$ and 5 to 300 ppm by weight of $Y_2O_3$, wherein the sintered body has an average grain diameter of 35 to 70 μm, the method comprising
a material blending step of mixing a main component and an additive to prepare a mixture,
a compact preparation step of forming the mixture to prepare a compact,
a preliminary firing step of subjecting the compact to a preliminary firing treatment to prepare a sintered body precursor, and
a principal firing step of subjecting the sintered body precursor to a principal firing treatment to produce the translucent polycrystalline sintered body.

12. A method according to claim 11, wherein the mixture is a slurry containing at least a solvent, a gelling agent, and a ceramic powder containing the main component and the additive, and the slurry is cast into a mold and then hardened to prepare the compact.

13. A method according to claim 11, wherein an organic binder in the compact is decomposed and removed in an oxidative atmosphere in the preliminary firing step, and the sintered body precursor is fired at a temperature of 1700° C. to 2000° C. in a hydrogen atmosphere or vacuum in the principal firing step.

14. A method according to claim 13, wherein the principal firing treatment is carried out multiple times in the principal firing step.

15. A method according to claim 13, wherein the sintered body precursor is fired at a temperature of 1700° C. to 2000° C. for 3 hours or more in the principal firing step.

16. A method according to claim 13, wherein MgO in the sintered body precursor is partially removed in the principal firing step.

17. A method according to claim 16, wherein the MgO content in the sintered body precursor is reduced in the principal firing step to ⅔ of an initial MgO content used in the material blending step.

18. A method according to claim 13, wherein an annealing treatment is carried out in air at a temperature of 1100° C. to 1600° C. after the principal firing treatment.

19. An arc tube for a high-intensity discharge lamp, comprising a translucent polycrystalline sintered body comprising an alumina as a main component, and comprising, as additives, 30 to 200 ppm by weight of MgO, 200 to 1200 ppm by weight of $ZrO_2$ and 5 to 300 ppm by weight of $Y_2O_3$, wherein the sintered body has an average grain diameter of 35 to 70 μm.

20. An arc tube for a high-intensity discharge lamp, comprising a translucent polycrystalline sintered body produced by a method comprising
a material blending step of mixing a main component and an additive to prepare a mixture,
a compact preparation step of forming the mixture to prepare a compact,
a preliminary firing step of subjecting the compact to a preliminary firing treatment to prepare a sintered body precursor, and
a principal firing step of subjecting the sintered body precursor to a principal firing treatment to produce the translucent polycrystalline sintered body,
wherein the sintered body comprises an alumina as a main component, and as additives, 30 to 200 ppm by weight of MgO, 200 to 1200 ppm by weight of $ZrO_2$ and 5 to 300 ppm by weight of $Y_2O_3$, wherein the sintered body has an average grain diameter of 35 to 70 μm.

* * * * *